(No Model.)
H. SOMMERFELD.
CHURN.
No. 404,443. Patented June 4, 1889.
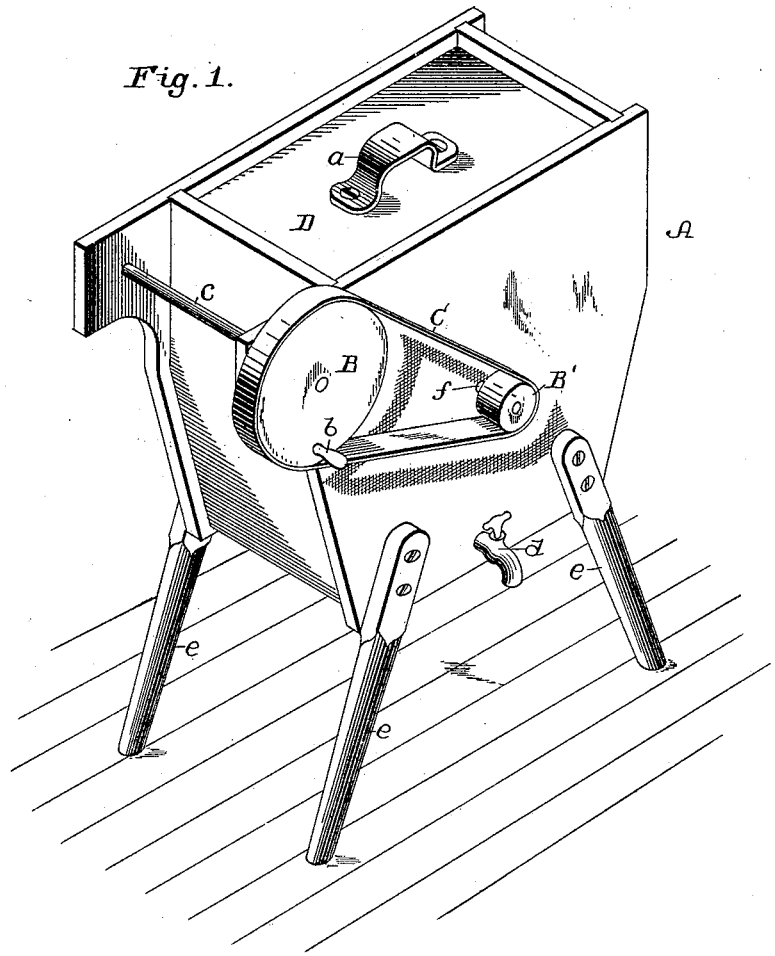
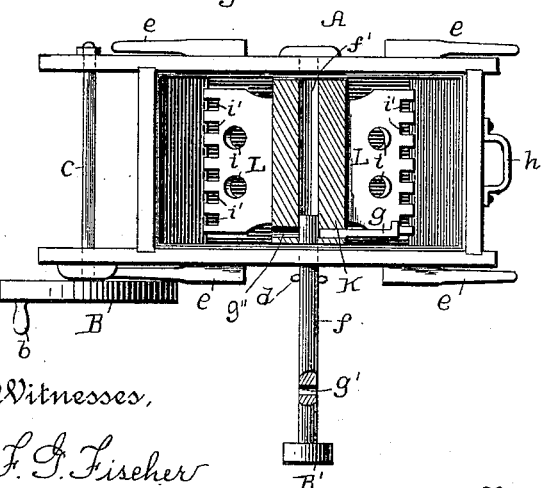
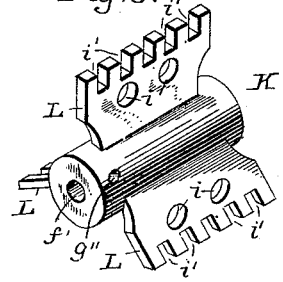
Witnesses,
F. G. Fischer
A. A. Higdon
Inventor
Heinrich Sommerfeld
By his Attorney
J. C. Higdon

UNITED STATES PATENT OFFICE.

HEINRICH SOMMERFELD, OF CANTON, ASSIGNOR TO A. EHRLICH, OF LEHIGH, KANSAS.

CHURN.

SPECIFICATION forming part of Letters Patent No. 404,443, dated June 4, 1889.

Application filed September 19, 1888. Serial No. 285,796. (No model.)

*To all whom it may concern:*

Be it known that I, HEINRICH SOMMERFELD, of Canton, McPherson county, Kansas, have invented certain new and useful Improvements in Rotary Single-Dasher Churns, of which the following is a full, clear, and exact description, reference being had to the accompanying drawings, forming a part thereof.

This invention relates to churns of that class having single rotary dashers; and it consists in the improvements in the form of the dasher pointed out hereinafter, and illustrated in the drawings.

Figure 1 is a perspective view of a churn embodying my invention. Fig. 2 is a plan view of the same, the cover being removed and the hub of the dasher shown in section. Fig. 3 is a detached perspective view of the dasher.

In the drawings, A represents the churn-body, supported upon legs $e$ and provided with a cover D, having the handle $a$. At one end of the body is arranged a shaft $c$, carrying a band-wheel B, provided with an operating-handle $b$.

C is a belt passing around the wheel and also around a wheel or pinion B' on the end of the dasher-shaft, which latter is driven thereby.

The dasher consists of a hub K, perforated longitudinally at $f'$ and provided with a number of blades or paddles L, which may be perforated, as at $i$, and notched, as at $i'$, to better agitate the milk. The dasher is mounted upon a shaft or spindle $f$, which extends through the apertures in the sides of the churn-body and also through the perforation $f'$ in the hub of the dasher, to which latter it is secured by means of a pin or key $g$, which passes through a transverse aperture $g''$ in the hub of the dasher and an aperture $g'$ in the shaft, as is clearly indicated in Fig. 2, so as to cause the dasher to rotate with the shaft. This construction enables the shaft to be easily withdrawn from the hub K, leaving the dasher free to be removed from the churn.

$d$ is a spigot, through which the milk may be withdrawn from the churn-body.

The advantages of this form of churn-dasher are the ease with which it may be separated from its shaft and removed from the churn, in order to facilitate gathering the butter and the thorough cleaning of all the parts.

I do not claim a rotary churn-dasher secured upon its shaft by means of set-screws which bear upon the exterior surface of the shaft, nor one that is secured by means of a fixed key or pin that is permanently driven to its place to bind the parts together, as I am aware that such construction is old; but,

Having thus described my invention, what I claim is—

The improved dasher consisting of the hub K, having the longitudinal perforation $f'$ and transverse perforation $g''$, and the radially-extending paddles L, said paddles having a series of notches $i'$ formed in their extreme terminal ends and a series of perforations $i$ located between the notches and the hub, in combination with the perforated shaft $f$ and pin $g$, substantially as shown and described.

In testimony whereof I affix my signature in presence of two witnesses.

HEINRICH SOMMERFELD.

Witnesses:
F. G. FISCHER,
A. A. HIGDON.